US007261165B1

(12) United States Patent
Black

(10) Patent No.: US 7,261,165 B1
(45) Date of Patent: Aug. 28, 2007

(54) APPARTUS FOR FIGHTING FOREST FIRES

(75) Inventor: Benjamin Black, 13014 Poydras Ct., Cypress, TX (US) 77429

(73) Assignee: Benjamin Black, Cypress, TX (US)

( * ) Notice: Subject to any disclaimer, the term of this patent is extended or adjusted under 35 U.S.C. 154(b) by 0 days.

(21) Appl. No.: 11/520,936

(22) Filed: Sep. 13, 2006

(51) Int. Cl.

| | |
|---|---|
| ***A62C 19/00*** | (2006.01) |
| ***A62C 3/00*** | (2006.01) |
| ***A62C 3/02*** | (2006.01) |
| ***A62C 35/02*** | (2006.01) |
| ***A62C 29/00*** | (2006.01) |
| ***B64D 1/16*** | (2006.01) |
| ***F42B 12/46*** | (2006.01) |

(52) U.S. Cl. ............................ 169/84; 169/26; 169/28; 169/29; 169/30; 169/52; 169/54; 169/70; 102/367; 102/369; 239/171

(58) Field of Classification Search .................. 169/84, 169/26, 28, 29, 30, 52, 54, 70, 35, 36, 51, 169/58; 239/171; 102/367, 369, 382; 244/129.2, 244/136
See application file for complete search history.

(56) References Cited

U.S. PATENT DOCUMENTS

| | | | | |
|---|---|---|---|---|
| 1,903,348 | A * | 4/1933 | Anderson | 102/369 |
| 2,091,589 | A * | 8/1937 | Finzi | 169/28 |
| 2,349,980 | A * | 5/1944 | Moore | 102/382 |
| 2,359,573 | A * | 10/1944 | MacKay | 169/36 |
| 2,665,768 | A * | 1/1954 | Talbot | 169/36 |
| 3,635,290 | A | 1/1972 | Schneider | |
| 3,833,063 | A * | 9/1974 | Williams | 169/28 |
| 3,980,139 | A * | 9/1976 | Kirk | 169/28 |
| 4,285,403 | A * | 8/1981 | Poland | 169/28 |
| 4,466,489 | A | 8/1984 | Lee | |
| 4,474,245 | A | 10/1984 | Arney | |
| 4,776,403 | A | 10/1988 | Lejosne | |
| 4,964,469 | A * | 10/1990 | Smith | 169/28 |
| 5,320,185 | A | 6/1994 | Foy et al. | |
| 5,507,350 | A | 4/1996 | Primlani | |
| 5,549,259 | A | 8/1996 | Herlik | |
| 6,012,531 | A * | 1/2000 | Ryan | 169/36 |
| 6,318,473 | B1 * | 11/2001 | Bartley et al. | 169/26 |
| 6,470,805 | B1 * | 10/2002 | Woodall et al. | 102/370 |
| 6,581,878 | B1 | 6/2003 | Bennett | |
| 6,796,382 | B2 * | 9/2004 | Kaimart | 169/43 |
| 7,089,862 | B1 * | 8/2006 | Vasquez | 102/369 |

* cited by examiner

*Primary Examiner*—Joseph A. Kaufman
*Assistant Examiner*—Darren Gorman

(57) ABSTRACT

A housing unit includes two parts that define a fire-smothering chemical storing interior volume. The housing unit is transported to a target area of a forest fire by an aircraft and dropped onto the target area. An explosive charge is located inside the housing unit and is detonated when the housing unit impacts the ground. The explosion associated with the detonated charge separates the two parts of the housing and disperses the chemical from the open housing unit.

2 Claims, 1 Drawing Sheet

APPARTUS FOR FIGHTING FOREST FIRES

TECHNICAL FIELD OF THE INVENTION

The present invention relates to the general art of forestry, and to the particular field of forest fire fighting.

BACKGROUND OF THE INVENTION

Every year millions of dollars worth of timber land, recreational facilities, homes and other natural resources are lost due to fire. Many of these fires take several days or even weeks to contain. Realizing that one way to stop the loss is to prevent the fires from occurring, great efforts are made and much time is spent in educating the public so that the fires will not occur. However, no matter how much care is taken, there is no way to stop forest fires from occurring.

Therefore, the next question is whether our present methods for fighting forest fires are adequate. Unfortunately, the answer seems to be "no." When a fire breaks out in one of our forests, many crews of men are sent in to try and contain it, but they are not given effective tools in order to achieve their task. The men generally try to stop the fire by digging holes and grading roads and just plain hoping that the fire will not jump across the fireline. For reasons discussed below, fire retardant sprays and powders that are presently being used are generally not effective in stopping the travel of the fire.

The conditions necessary for the existence of fire are the presence of a combustible substance, a temperature high enough to cause or support combustion (called the kindling temperature), and the presence of enough oxygen (usually provided by the air) to enable combustion to continue. Therefore, fire fighting consists of removing one or more of these. It is known in the art to have water supplied to a fire to cool the fire below combustion temperatures. It is also known to involve chemicals other than water, especially useful for fires involving flammable liquids, particularly when water may be dangerous.

A variety of chemicals may be added to water to improve its ability to extinguish fires. For example, wetting agents added to water can reduce its surface tension. This makes the water more penetrating and facilitates the formation of small drops necessary for rapid heat absorption. Also, by adding foam-producing chemicals and liquids to water, a fire-blanketing foam is produced which is used to extinguish fires in combustible liquids, such as oil, petroleum, and tar, and for fighting fires at airports, refineries, and petroleum distribution facilities chemical additive can also expand the volume of foam, perhaps by 1000 times. This high-expansion foam-water solution is useful in fighting fires in basements and other difficult-to-reach areas because, the fire can be smothered quickly with relatively little water damage. It is also known to use chemicals, such as carbon dioxide, to displace needed oxygen from a fire. Carbon dioxide is used particularly for extinguishing fires because it does not burn and does not support ordinary combustion.

It is also known to have various equipment to deliver water or other chemicals to the fire. With the development of the internal-combustion engine early in the Twentieth Century, Fire Department pumpers became motorized. Because of problems in adapting geared rotary gasoline engines to pumps, the first gasoline-powered fire engines had two motors, one to drive the pump and the other to propel the vehicle. The pumps were originally of the piston or reciprocating type, but these were gradually replaced by rotary pumps and finally by centrifugal pumps, used by most modern pumpers. At the same time, the pumper acquired its main characteristics: a powerful pump that can supply water in a large range of volumes and pressures; several thousand feet of fire hose, with short lengths of large-diameter hose for attachment to hydrants; and a water tank for the initial attack on a fire while fire fighters connect the pump to hydrants, and for areas where no water supply is available. In rural areas, pumpers carry suction hose to draw water from rivers and ponds.

Various nozzles are capable of projecting solid, heavy streams of water, curtains of spray, or fog. Fire trucks carry a selection of nozzles, which are used according to the amount of heat that must be absorbed. Nozzles can apply water in the form of streams, spray, or fog at rates of flow between 57 liters (15 gal) to more than 380 liters (more than 100 gal) per minute. Straight streams of water have greater reach and penetration, but fog absorbs heat more quickly because the water droplets present a greater surface area and distribute the water more widely. Fog nozzles may be used to disperse vapors from flammable liquids, although foam is generally used to extinguish fires in flammable liquids.

Methods of fighting forest fires are necessarily different than fighting areas in developed areas, where access and water supply are generally less of a problem. Forest fires, often called wildland fires, are spread by the transfer of heat, in this case to grass, brush, shrubs, and trees.

Fire-fighting crews are trained and organized to handle fires covering large areas. They establish incident command posts, commissaries, and supply depots. Two-way radios are used to control operations, and airplanes are employed to drop supplies as well as chemicals. Helicopters serve as command posts and transport fire fighters and their equipment to areas that cannot be reached quickly on the ground. Some severe wildfires have required more than 10,000 fire fighters to be engaged at the same time.

Various forest fire fighting techniques are known in the art. However, the inventor has observed that these techniques require placing the fire fighting chemicals onto the fire from above. This may be difficult and may be inefficient. This is especially true if access is limited or difficult. In a forest fire, an aircraft may be used to drop chemicals onto the fire from above, but such chemicals must be designed to penetrate extremely hot conditions before reaching a location at which they can be effective. This may be inefficient. Furthermore, some of the chemicals may become dispersed in trees or other objects that are well above ground level thereby diminishing the amount of fire fighting chemical reaching the ground.

For example, aircraft such as the C-130 presently used for fire fighting by agencies such as the U.S. Forest Service are outfitted with liquid fire retardant dispersal systems including a liquid retardant reservoir, compressed air tanks, air compressor, discharge tube and nozzles, and related equipment all mounted on movable pallets. The systems are designed to perform multiple individual discharges each of several hundred gallons over a 4 to 5 second period, in a single flight, or to discharge the entire contents in a single burst. The systems are generally large and heavy, have power requirements that severely tax the available power supply aboard an aircraft, and potential electromagnetic interference (EMI) from the equipment that can be disruptive to the aircraft avionics.

Because it is frequently difficult to extinguish a forest fire by attacking it directly, the principal effort of forest fire fighters is often directed toward controlling its spread by creating a gap, or firebreak, across which fire cannot move. Firebreaks are made, and the fire crews attempt to stop the fire by several methods: trenching, direct attack with hose streams, the aforementioned aerial dispersing, spraying of fire-retarding chemicals, and controlled back-burning. As much as possible, advantage is taken of streams, open areas, and other natural obstacles when establishing a firebreak. Wide firebreaks may be dug with plows and bulldozers. The sides of the firebreaks are soaked with water or chemicals to slow the combustion process. Some parts of the fire may be allowed to burn themselves out. Fire-fighting crews must be alert to prevent outbreaks of fire on the unburned side of the firebreaks.

Furthermore, reflash, or re-ignition of an extinguished area may still occur if conditions are right. This presents a serious drawback in fighting the fire, and also presents a serious danger to crews. Chemicals applied from above may permit such conditions to occur.

It is clear that fire fighting, both in wilderness conditions and in developed areas, still lacks a capability of an immediate response safe to the fire fighter because of an inability to immediately deliver fire retarding chemicals to the fire in an efficient manner and in a manner that will prevent reflash of the fire.

SUMMARY OF THE INVENTION

The forest fire fighting system embodying the present invention includes a cylindrical housing that is pressurized with liquid and gas fire-displacing chemicals. A small explosive charge in the center of the housing detonates upon contact with the ground. Detonation releases the chemicals at the fire's level. The chemicals remove the oxygen from the fire's environment, smother the fire's fuel and prevent reflash in the area thus treated. The system embodying the present invention breaks up hotspots in a forest fire to allow crews to more easily work with smaller contained fires.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 2:
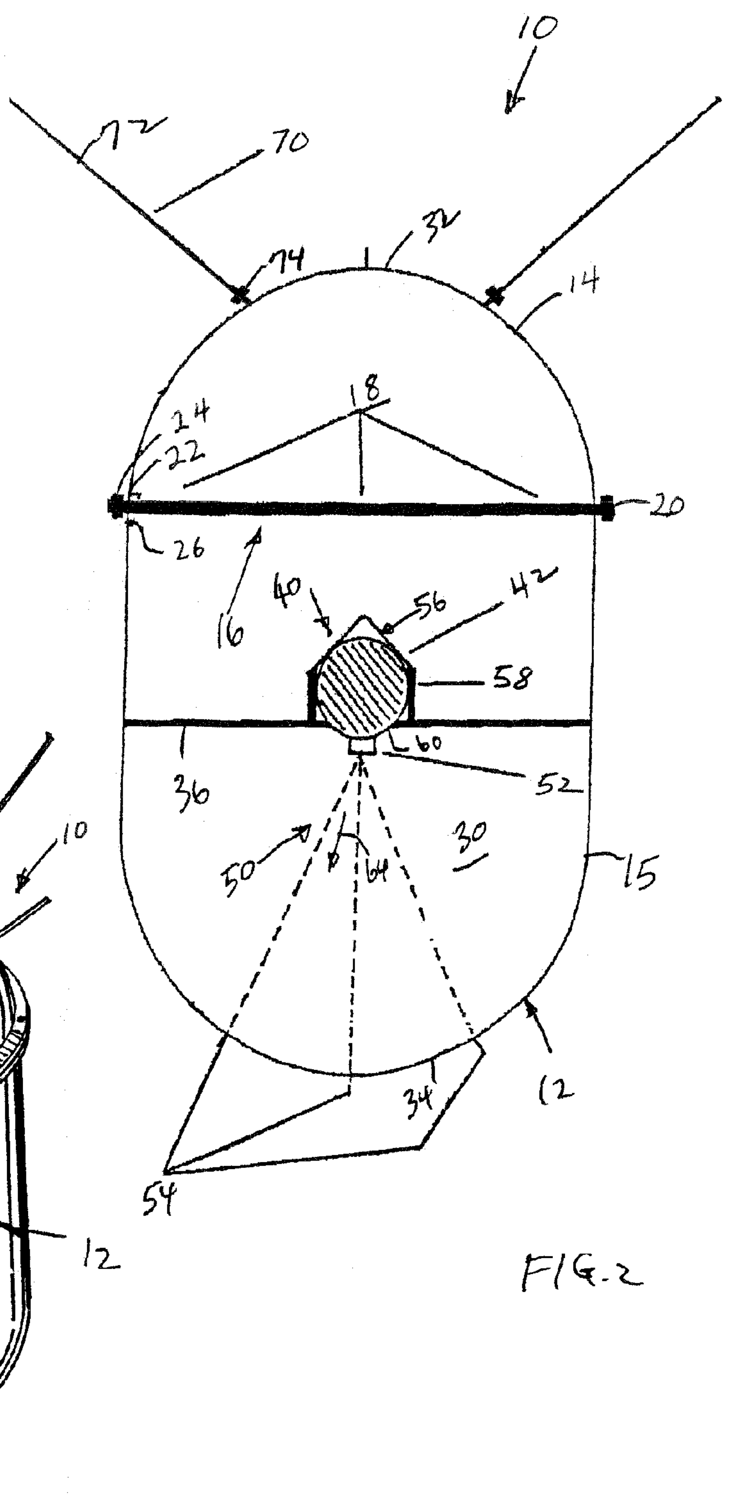
FIG. 2 is a sectional view taken along line 2-2 of FIG. 1 showing the internal structure of the housing shown in FIG. 1.
Figure 1:
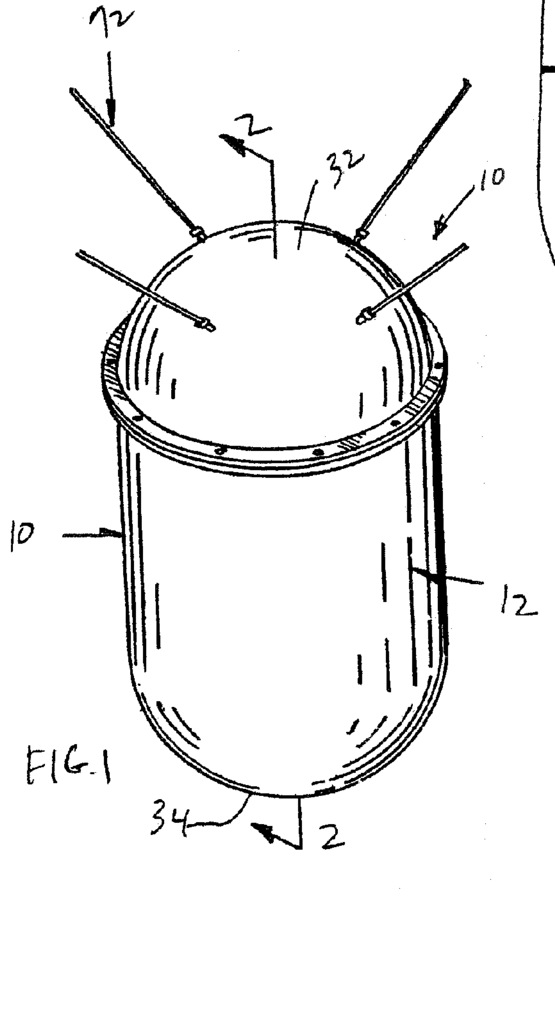
FIG. 1 is a perspective view of a housing included in a fire fighting system embodying the present invention.

Referring to the figures, it can be understood that the present invention is embodied in a unit 10 for fighting forest fires. Unit 10 is carried to a target location on an airplane or on a helicopter, and is then dropped into the fire. Unit 10 will fall through the fire and any trees or the like that may be located in the drop zone and impact the ground. Upon impact, unit 10 will open and disperse fire-smothering chemicals on the ground. This ground-located dispersion will smother the fire at its source and will remain in place even after the fire is extinguished. This feature of the unit will reduce, if not totally eliminate, re-ignition of an extinguished fire. Furthermore, brush, trees or the like is not likely to interfere with the dropping of unit 10 so accuracy will be enhanced.

Unit 10 comprises a housing unit 12 which can be formed of stainless steel, fiberglass or the like. Housing unit 12 includes a first part 14 and a second part 15 and a coupling element 16 releasably coupling the first part to the second part. The coupling element can include a bolt 18 having a head 20 and a threaded end 22 to which a nut 24 is threadably attached. The two parts of the housing unit can be separated from each other after the coupling element is released so chemicals can be placed in the housing unit. An O-ring 26 can be interposed between the two parts of the housing unit to ensure proper sealing of the housing unit.

Housing unit 10 further includes a hollow interior volume 30 which is adapted to contain a fire-smothering chemical, a first end 32, a second end 34 and a support structure 36 in interior volume 30. The support structure can be a shelf-like element mounted on the housing unit.

An explosive unit 40 is mounted on the housing unit and includes an explosive charge 42 supported on support structure 36 inside the hollow interior volume. The exact nature of the explosive charge is not important to the instant invention and those skilled in the art will understand the type and size of the explosive charge based on the teaching of the present disclosure. Accordingly, the details of explosive charge 42 will not be presented.

An explosive charge detonator system 50 includes a detonator cap 52 on the explosive charge and a plurality of spaced apart detonator pins 54 located on second end 34 of the housing unit. Each of the detonator pins is connected to the detonator cap to ignite the detonator cap upon impact with the ground. The detonator pins being spaced apart from each other so the explosion can be initiated upon any section of second end 34 impacting the ground.

A housing 56 is located adjacent to the explosive charge and has walls 58 that enclose the explosive charge in all areas except one. The open area is indicated in FIG. 2 as area 60. Area 60 is located to direct an explosion associated with the explosive charge toward the second end of the housing unit upon explosion of the explosive charge, as indicated in FIG. 2 by arrow 64. The explosion associated with the explosive charge causes the first part of the housing unit to separate from the second part of the housing unit and causes the fire-smothering chemical located inside the hollow interior of the housing unit to be dispensed and dispersed from the thus opened housing unit.

A support system 70 is located on first end 32 of the housing unit. Support system 70 includes airbrakes 72 releasably coupled to the housing unit by bolts 74 or the like.

In use, unit 10 is suspended from an aircraft and transported to a fire site. Once at a target site, unit 10 is released from the aircraft and drops to the ground. Unit 10 will fall through trees and brush so it will contact the ground. The air brake system ensures that the housing unit will fall in an orientation that ensures second end 34 striking the ground. As soon as second end 34 of unit 10, one or more of the detonator pins will cause explosive charge 42 to detonate thereby separating the two parts of the housing unit from each other and dispersing any fire-smothering chemical stored inside the housing unit over the target area. Filling housing unit 10 and locating the explosive charge inside the housing unit is facilitated by the separable nature of the two parts of the housing unit.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A unit for fighting forest fires comprising:

A) a housing unit which includes a first part and a second part and a coupling element releasably coupling the first part to the second part, the housing unit having (1) a hollow interior volume which is adapted to contain a fire-smothering chemical, (2) a first end, (3) a second end, and (4) a support structure in the interior volume;

B) an explosive unit on the housing unit and which includes (1) an explosive charge supported on the support structure inside the hollow interior volume, (2) an explosive charge detonator system which includes (a) a detonator cap on the explosive charge, and (b) a plurality of detonator pins located on the second end of the housing unit, each of the detonator pins being connected to the detonator cap to ignite the detonator cap upon impact with the ground, the detonator pins being spaced apart from each other, and (c) a housing located adjacent to the explosive charge and having walls that enclose the explosive charge in all areas except one, with the one area being located to direct an explosion associated with the explosive charge toward the second end of the housing unit upon explosion of the explosive charge, the explosion associated with the explosive charge causing the first part of the housing unit to separate from the second part of the housing unit to open the housing unit and causing the fire-smothering chemical located inside the hollow interior of the housing unit to be dispensed and dispersed from the open housing unit; and C) a support system on the first end of the housing unit.

2. The unit for fighting forest fires defined in claim 1 further including a sealing ring interposed between the two parts of the housing unit.

* * * * *